(12) United States Patent
Enyedy

(10) Patent No.: US 7,383,973 B2
(45) Date of Patent: Jun. 10, 2008

(54) DRIVE ROLLERS FOR WIRE FEEDING MECHANISM

(75) Inventor: Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 645 days.

(21) Appl. No.: 10/800,929

(22) Filed: Mar. 15, 2004

(65) Prior Publication Data
US 2005/0199673 A1 Sep. 15, 2005

(51) Int. Cl.
B65H 23/18 (2006.01)
B65H 20/00 (2006.01)

(52) U.S. Cl. .................. 226/181; 226/177; 226/187; 226/193

(58) Field of Classification Search ............ 242/177, 242/178, 181, 182, 184, 185, 187, 188, 193
See application file for complete search history.

(56) References Cited

U.S. PATENT DOCUMENTS 3,672,655 A * 6/1972 Carter .................. 226/108
4,068,106 A * 1/1978 Shaputis ............... 219/137.2
4,235,362 A 11/1980 Hubenko
5,540,371 A * 7/1996 Gilliland ..................... 226/4
5,816,466 A 10/1998 Seufer
6,318,614 B1 * 11/2001 Boyd ..................... 226/181
6,427,894 B1 * 8/2002 Blank et al. ............. 226/177
6,557,742 B1 5/2003 Bobeczko et al.

* cited by examiner

Primary Examiner—Evan H. Langdon
(74) Attorney, Agent, or Firm—Fay Sharpe LLP

(57) ABSTRACT

A wire feeding mechanism for advancing a continuous length of wire along a pathway includes a housing having two roller supports each rotatable about a corresponding axis transverse to a wire pathway. The roller supports are on opposite sides of the pathway and are driveably engaged with each other. A drive roller is on each of the roller supports for rotation therewith. The drive roller includes an outer surface extending circumferentially about the corresponding axis. The outer surface defines a groove having an included angle of less than ninety degrees (90°). The drive roller on each of the roller supports compressively contacts a continuous length of wire between the roller supports such that the wire is advanced along the pathway in response to rotation of the drive rollers.

20 Claims, 2 Drawing Sheets

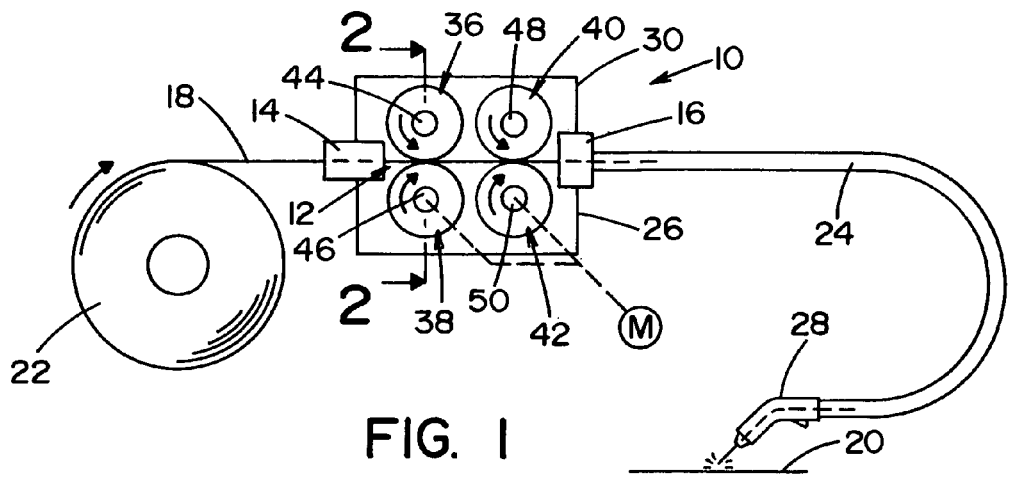
FIG. 1
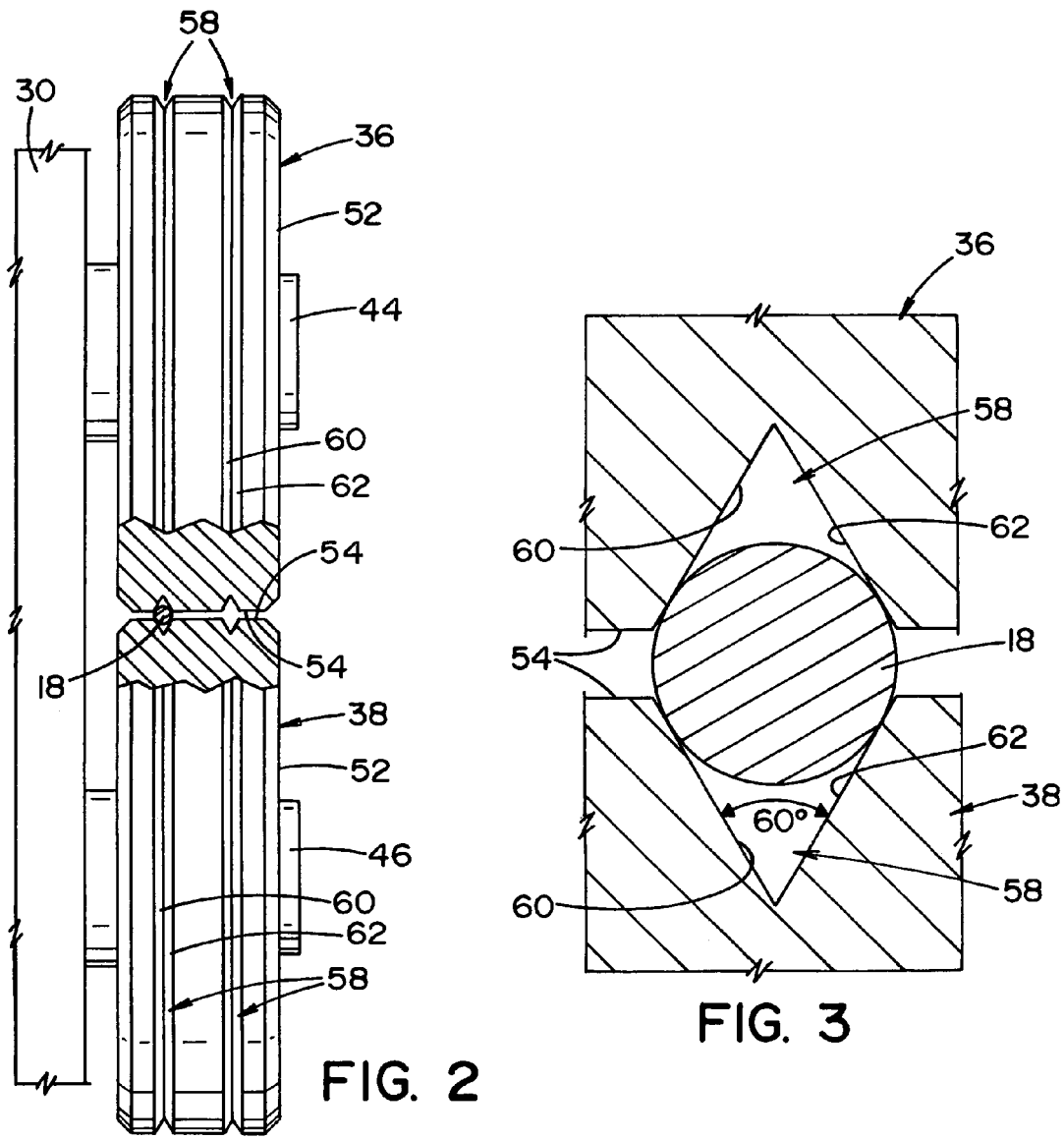
FIG. 2
FIG. 3

DRIVE ROLLERS FOR WIRE FEEDING MECHANISM

BACKGROUND OF THE INVENTION

1. Field of the Invention

The present invention relates to the art of wire feeding mechanisms and, more particularly, to drive rollers used in wire feeding mechanisms for driveably advancing a welding wire. The present invention finds particular application in conjunction with drive rollers used to advance a welding wire and will be described with particular reference thereto. It is to be appreciated, however, that the present invention may relate to other similar environments and applications.

2. Discussion of the Art

U.S. Pat. No. 6,557,742 to Bobeczko et al., U.S. Pat. No. 5,816,466 to Seufer and U.S. Pat. No. 4,235,362 to Hubenko, all expressly incorporated herein by reference, disclose wire feeding mechanisms and provide general background information related thereto.

Wire feeding mechanisms that move consumable electrode wire from a supply reel to a welding gun are generally well known. For example, Seufer discloses a wire feed mechanism having a wire pathway through which a continuous length of wire is advanced. Typically, wire feed mechanisms include motor-driven drive rolls that engage diametrically opposite sides of a wire to move the wire along a path through a housing of the feeding mechanism. Once through the housing, the wire is moved through a flexible tube or conduit leading to a welding gun. Often, the conduit also carries shielding gas and electrical current to the welding gun.

Typically, each of the drive rollers is mounted on a roller support and all of the roller supports are driveably engaged with one another. Thus, powered rotation of a single roller support causes rotation of all the roller supports and the drive rollers supported thereon. Usually, the drive rolls are a single pair of opposed rollers or a double pair of opposed rollers spaced apart along the wire path. In either arrangement, the drive rollers have an upstream side at which the wire enters the drive rollers and a downstream side at which the wire exits the driver rollers. On the upstream side, the wire is guided through an upstream tube toward a bite created between the drive rollers adjacent the upstream side. Likewise, on the downstream side, the wire exits the drive rollers and is guided through a downstream tube adjacent the downstream side. If a double pair of opposed rollers are used, another tube can be provided between the pairs of drive rollers to further guide the wire.

To impart an advancing force or motion to the wire, opposing drive rollers are positioned sufficiently close to one another so that the wire extending along the pathway is compressed between the opposing rollers. The compressive force in combination with friction between the material of the wire and the rollers advances the continuous length of wire along the wire path in a generally smooth and continuous manner. In some arrangements, one or more of the drive rollers are urged toward the wire by a biasing member to further impart an advancing force or motion on the wire.

The wire passing through the drive rollers has a generally round cross-section and is engaged tangentially by opposing, flat-faced drive rollers mounted transversely to the wire. As a result of this arrangement, the compressive forces exerted on the wire by the driver rollers often cause the wire to undesirably deform. The material characteristics of the wire largely determine the magnitude or amount the wire is deformed as a result of the compressive forces. Accordingly, a wire made from a material having a relatively high compressive yield strength, such as steel, will be deformed less than a wire made from a material having a moderate compressive yield strength, such as aluminum.

In some applications, one or both of each pair of drive rollers include U-shaped or V-shaped grooves extending circumferentially thereabout for reducing the deformation of the wire from the compressive forces of the drive rollers. When such grooves are employed, the wire is engaged by side walls of the drive roller forming the groove. As a result, the compressive force exerted by the drive roller with a groove tends to act and deform the wire along more of the wire's outer surface than if no groove was provided. More contact between the drive roller and the wire results in less deformation.

When grooves are used, they are typically employed in one of two arrangements. In one arrangement, with reference to FIG. 4, a pair of relatively shallow angled grooves 100,102 are provided on opposed drive rollers 104,106. More particularly, the first groove 100 in the first drive roller 104 is defined by side walls 108,110 which are at an angle of ninety degrees (90°) relative to one another. Likewise, the second groove 102 in the second drive roller 106 is defined by side walls 112,114 which are at an angle of ninety degrees (90°) relative to one another. Since both grooves 100,102 are configured alike, the drive rollers 104,106 grip wire 116 with an equal amount of force. A centerline of the wire 116 is generally centered between the drive rollers 104,106.

In the other arrangement, with reference to FIG. 5, a relatively sharp-angled groove 120 is provided in a first drive roller 122 and no groove is provided in a second, opposite drive roller 124. The groove 120 is defined by side walls 126,128 in the first drive roller 122 which are at an angle of between thirty and sixty degrees (30°-60°) and, preferably, an angle of sixty degrees (60°). The second drive roller 124, also referred to as a flat idler roller, has a flat surface 130 for engaging wire 132. A centerline of the wire 132 often sits below flat surface 134 of the first drive roller 122 which is the surface in which the groove 120 is formed. More particularly, the flat idler roller 124 pushes the wire 132 into the groove 120 which in turn propels the wire 132.

While these types of groove arrangements tend to lessen the amount a wire is deformed, the amount of compressive force required to input motion to the wire remains high. Reductions in the required compressive force are generally considered desirable and can decrease wear on the wire feed mechanism and/or reduce slippage of the wire relative to the drive rollers. Accordingly, any improvements to the drive rollers that decreases the required compressive force needed to drive the wire engaged by the drive rollers is deemed desirable.

SUMMARY OF THE INVENTION

The present invention provides new and improved drive rollers for use in wire feed mechanisms that overcome the foregoing difficulties and others and provide the aforementioned and other advantageous features. More particularly, in accordance with one aspect of the present invention, a wire feeding mechanism is provided for advancing a continuous length of wire along a pathway. In accordance with this aspect of the invention, the wire feeding mechanism includes a housing having two roller supports each rotable about a corresponding axis transverse to a wire pathway. The roller supports are on opposite sides the pathway and are driveably engaged with each other. A drive roller is on each of the roller supports for rotation therewith. The drive roller includes an outer surface extending circumferentially about the corresponding axis. The outer surface defines a groove having an included angle of less than ninety degrees (90°). The drive roller on each of said roller supports compressively contacts a continuous length of wire between the roller supports such that the wire is advanced along the pathway in response to rotation of the drive rollers.

In accordance with another aspect of the present invention, a wire feeding mechanism is provided for advancing a continuous length of wire along a pathway. More particularly, in accordance with this aspect of the invention, the wire feeding mechanism includes a housing having two roller supports each rotatable about a corresponding axis transverse to a wire pathway. The roller supports are on opposite sides of the pathway and are driveably engaged with each other. A first drive roller is concentrically disposed with one of the two roller supports for rotation therewith. The first drive roller includes a first drive roller groove extending circumferentially therearound and having a first drive roller included angle of less than ninety degrees (90°). A second drive roller is concentrically disposed with the other of the two roller supports for rotation therewith. The second drive roller includes a second drive roller groove extending circumferentially therearound and having a second drive roller included angle of less than ninety degrees (90°). The first and second drive rollers are positioned relative to one another such that a continuous length of wire received in the circumferential grooves between the first and second drive rollers is advanced along the passageway in response to rotation of the first and second drive rollers.

In accordance with yet another aspect of the present invention, a wire feeding mechanism is provided for advancing a continuous length of wire along a pathway. More particularly, in accordance with this aspect of the invention, the wire feeding mechanism includes a first drive roller rotably supported in a housing for engaging and advancing a continuous length of wire along a pathway. A second drive roller is rotably supported in the housing on an opposite side of the pathway from the first drive roller for engaging and advancing the wire along the pathway. The first and second drive rollers each include an outer surface extending circumferentially thereabout. The outer surface has a first side wall and a second side wall that together define a groove. The first side wall is oriented at an angle of less than ninety degrees (90°) relative to the second side wall.

BRIEF DESCRIPTION OF THE DRAWINGS

The invention may take form in various components and arrangements of components and in various steps and arrangements of steps. The drawings are only for purposes of illustrating preferred embodiments and are not to be construed as limiting the invention.

FIG. 1 is a schematic view of a wire feeding mechanism having drive rollers in accordance with a preferred embodiment of the present invention.

FIG. 2 is a partial elevational view of the wire feeding mechanism taken at the line 2-2 of FIG. 1 with a portion of a first set of drive rollers and a wire shown in cross-section.

FIG. 3 is an enlarged partial cross-sectional view of the engagement between the drive rollers and the wire.

DETAILED DESCRIPTION OF THE PREFERRED EMBODIMENT

Figure 4:
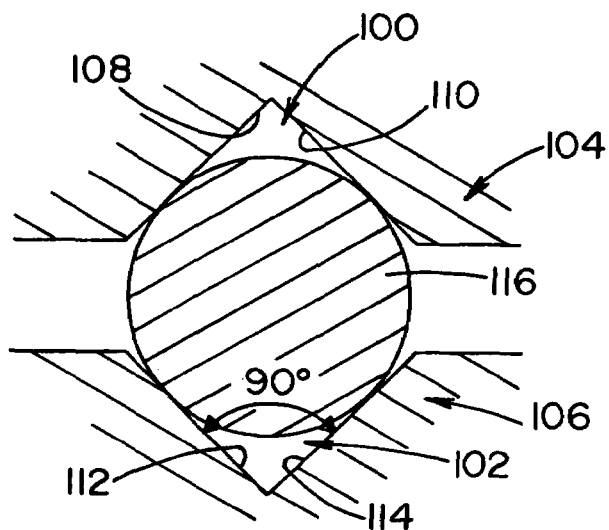
FIG. 4 is an enlarged partial cross-sectional view of an engagement between drive rollers and a wire according to one drive roller arrangement of the prior art.

Referring now to the drawings wherein the showings are for purposes of illustrating one or more preferred embodiments of the invention only and not for purposes of limiting the same, FIG. 1 shows a wire feeding mechanism 10 having a wire pathway 12 defined in part by wire support guides 14,16. The wire feeding mechanism 10 is generally situated between a bulk supply of wire 18 and a workpiece 20. The wire 18 extends from the bulk supply, shown as roll 22 in FIG. 1, to the wire feeding mechanism 10, and further extends to the workpiece 20 where it is consumed in the process of welding. The wire 18 can be alternatively supplied in a wide variety of other bulk forms, including for example boxes, reels and the like.

Generally, a flexible conduit 24 extends from the mechanism 10 on a downstream side 26 thereof such that the wire 18 will be advanced by the mechanism 10 through the conduit 24 to a welding gun 28 adjacent the workpiece 20. As the mechanism 10 axially advances the wire 18 along the pathway 12, the advancing wire is radially supported and guided by the flexible conduit 24 toward the workpiece 18 until the wire 18 reaches the gun 28 and is consumed during the welding process. As is known, the conduit 24 can optionally carry shielding gas and electrical current to the welding gun 28. Alternatively, the flexible conduit 24 can be replaced with a rigid conduit terminating at a welding head. In any arrangement, it is to be appreciated that both conduit and welding guns are commonly known and therefore need not be described in further detail herein.

The wire feeding mechanism 10 includes a housing 30 through which the wire pathway 12 is defined. More particularly, the tubular wire support guides 14,16 are spaced along the wire pathway 12 and are oriented such that passages therethrough are axially aligned along and partially define the pathway 12. The wire feeding mechanism 10 further includes a first set of drive rollers 36,38 and a second set of drive rollers 40,42 disposed along the pathway 12 in spaced relation relative to one another. The drive rollers 36-42 function to advance the continuous length of wire 18 as will be described in more detail below. More particularly, one drive roller from each pair of drive rollers, drive roller 36 and drive roller 40, is disposed on one side of the pathway 12 and the other drive roller from each pair, drive roller 38 and drive roller 42, is disposed on the other side of the pathway 12. Each of the rollers 36-42 is positioned radially adjacent the pathway and tangentially contacts the wire 18. As is known, one or more of the drive rollers 36-42 can be radially adjustably positionable relative to the wire pathway 12.

On an upstream side of the driver rollers 36-42, the support guide 14 receives the wire 18 from the roll 22 and directs the wire 18 into a bite defined between the first set of drive rollers 36,38. On a downstream side of the drive rollers 36-42, the support guide 16 receives the wire 18 from the second set of drive rollers 42,44 and directs the wire 18 into the conduit 24. A third support guide (not shown) can be provided between the sets of drive rollers 36,38 and 40,42 to guide the wire 18 from the first set of drive rollers 36,38 into the second set of drive rollers 40,42. The tubular support guides optionally include tapered interior surfaces to further facilitate guiding of the wire 18.

The first set of drive rollers 36,38 are carried on roller supports 44,46 for rotation therewith. The roller supports 44,46 are rotatably mounted in the housing 30 about respective roller support axes transverse to the wire pathway 12.

The drive rollers 36,38 have respective drive roller axes coaxial with the respective roller support axes. Likewise, the second set of drive rollers 40,42 are carried on roller supports 48,50 for rotation therewith. The roller supports 48,50 are rotatably mounted in the housing 30 about respective axes transverse to the wire pathway spaced apart from the first set of drive rollers 36,38. The drive rollers 40,42 have respective drive roller axes coaxial with the respective roller support axes. The roller supports 44-50 are driveably engaged to one another. Thus, powered rotation of the roller supports 46,50 by a motor M causes rotation of the other roller supports 44,48.

With additional reference to FIG. 2, each of the drive rollers 36-42 (only drive rollers 36,38 shown in FIG. 2) includes a hub 52 having an outer surface 54 extending circumferentially about the corresponding drive roller axis. To impart an advancing force or motion to the wire 18, opposing sets of the drive rollers 36,38 and 40,42 are positioned sufficiently close to one another so that the wire 18 extending along the pathway 12 is compressed between the rollers 36-42. The compressive force in combination with friction between the wire 18 and the rollers 36-42 advances the continuous length of wire 18 along the wire path 12 in a generally smooth and continuous manner. Optionally, one or more of the drive rollers 36-42 can be urged toward or into the wire 18 to further impart an advancing force or motion to the wire 18 when the rollers 36-42 are rotating.

In one preferred embodiment, with reference to FIGS. 2 and 3, the drive rollers 36-42 include V-shaped grooves 58 defined by angled sidewalls 60,62. The grooves extend circumferentially about the drive rollers 36-42 and serve to reduce the deformation of the wire 18 caused by the compressive forces of the drive rollers 36-42. More particularly, the wire 18 is engaged by the sidewalls 60,62 of the drive rollers 36-42. As a result, the compressive forces exerted by each pair of drive rollers 36,38 and 40,42 contact and deform the wire 18 at four general contact locations. As a result of the four contact locations, the drive rollers 36-42 tend to deform the wire 18 to a lesser extent than those without V-shaped grooves. In the illustrated embodiment, the drive rollers 36-42 have a pair of V-shaped grooves 58. One of the V-shaped grooves 58 on each drive roller 36-42 can be used until its defining surfaces 60,62 have degraded to a sufficient extent. Then, the wire 18 can be moved to the second of the V-shaped grooves 58. Only after both V-shaped grooves are worn out might the drive roller need to be replaced or refurbished. Alternately, the grooves 58 on each drive roller may be configured for use with varying sizes of wire.

In any arrangement, each of the V-shaped grooves 58 has an included angle of less than ninety degrees (90°). The included angle is the angle defined between the sidewalls 60 and 62. Thus, the grooves 58 are relatively sharp as compared to the two-groove arrangement of FIG. 4 which has grooves 100,102 with included angles of ninety degrees (90°). As will be described in more detail below, the sharp groove 58 provides a mechanical advantage so that the rollers 36,38 grip the wire 18 tighter than prior art rollers having grooves with relatively shallow grooves.

Preferably, the included angles of the grooves 58 are about thirty to sixty degrees (30°-60°) and, more preferably, about sixty degrees (60°). Because the grooves 58 are substantially similar on opposed rollers 36,38 and 40,42, a centerline of the wire 18 is between outer surfaces 54 of the rollers and is above the outer surface 54 of any particular roller 36-42. By maintaining relatively tight tolerances in the grooves 58, the wire 18 is assured of contacting the sidewalls 60,62 while maintaining a gap between opposed rollers 36,38 and 40,42. Prior art roller arrangements, such as that shown in FIG. 5, occasionally utilized a roller 122 with a sharp angled groove 120 but the opposing roller 124 was flat. This arrangement was used to ensure the sidewalls 126,128 appropriately contacted the wire 132 while maintaining a gap between the rollers 122,124. Two sharp angled, opposed grooves were not considered because, heretofore, tight tolerances of grooves 58 could not be ensured. However, modern machine has made it possible to ensure tight tolerances so that opposed grooves 58 are aligned and, when wire 18 is received therebetween, a gap is maintained between opposed drive rollers 36,38.

One advantage of the sharp angled grooves 58 on opposing rollers 36,38 is that the rollers 36,38 exert more pulling power as compared to shallow angled grooves (FIG. 4). By way of example, where $F_D$ represents the normal force of a drive roll acting on the wire, the vertical component of $F_D$ is related to the normal (clamping) force $F_C$ by the following equation:

$$F_D = \frac{F_C}{2\sin\left(\frac{\theta}{2}\right)}$$

where θ is the angle between the sidewalls defining a groove in the roller. The frictional force between the drive roller and the wire can be represented by:

$$f = \mu_f F_D$$

where $\mu_f$ is the coefficient of friction. The drive force $F_e$ generated by one of the drive rollers becomes:

$$F_e = \frac{\mu_f \cdot F_c}{2\sin\left(\frac{\theta}{2}\right)}$$

Figure 5:
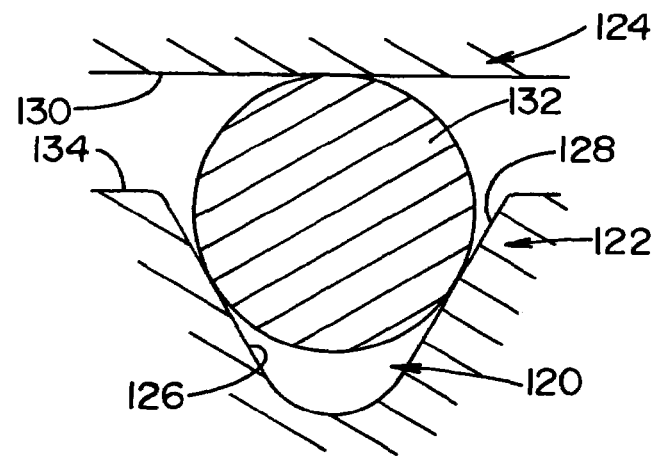
FIG. 5 is an enlarged partial cross-sectional view of an engagement between drive rollers and a wire according to another drive roller arrangement of the prior art.

Using this equation, it can be readily observed that the drive force generated by sharp angled rollers, such as rollers 36,38, is greater than that generated by either of the prior art arrangements shown in FIGS. 4 and 5.

The invention has been described with reference to the preferred embodiments. Obviously, modifications and alterations will occur to others upon reading and understanding the preceding description. It is intended that the invention be construed as including all such modifications and alterations insofar as they are within the scope of the appended claims or the equivalents thereof.

The invention claimed is:

1. A wire feeding mechanism for advancing a continuous length of wire along a pathway, comprising:
   a housing having two roller supports each rotatable about a corresponding axis transverse to a wire pathway, said roller supports being on opposite sides of said pathway and being driveably engaged with each other;
   a drive roller on each of said roller supports for rotation therewith, said drive roller including an outer surface extending circumferentially about said corresponding axis that defines a groove having an included angle between a pair of intersecting walls defining the groove that is about thirty degrees (30°) or greater and less than ninety degrees (90°), said drive roller on each of said roller supports compressively contacting a continuous length of wire between said roller supports such that said wire is advanced along said pathway in response to rotation of said drive rollers.

2. The wire feeding mechanism of claim 1 wherein said included angle is about thirty to about sixty degrees (30°-60°).

3. The wire feeding mechanism of claim 2 wherein said included angle is about sixty degrees (60°).

4. The wire feeding mechanism of claim 1 wherein a centerline of said continuous length of wire is above said outer surface of said drive roller.

5. The wire feeding mechanism of claim 4 wherein said included angle is about thirty to about sixty degrees (30°-60°).

6. A wire feeding mechanism for advancing a continuous length of wire along a pathway, comprising:
 a housing having two roller supports each rotatable about a corresponding axis transverse to a wire pathway, said roller supports being on opposite sides of said pathway and being driveably engaged with each other;
 a first drive roller concentrically disposed with one of said two roller supports for rotation therewith, said first drive roller including a first drive roller groove extending circumferentially therearound and having a first drive roller included angle of at least about thirty degrees (30°) and less than ninety degrees (90°), said first drive roller groove defined by a pair of intersecting walls;
 a second drive roller concentrically disposed with the other of said two roller supports for rotation therewith, said second drive roller including a second drive roller groove extending circumferentially therearound and having a second drive roller included angle of at least about thirty degrees (30°) and less than ninety degrees (90°), said second drive roller groove defined by a pair of intersecting walls; and
 said first and second drive rollers positioned relative to one another such that a continuous length of wire received in said circumferential grooves between said first and second drive rollers is advanced along said passageway in response to rotation of said first and second drive rollers.

7. The wire feeding mechanism of claim 6 wherein said included angles are each about thirty to about sixty degrees (30°-60°).

8. The wire feeding mechanism of claim 6 wherein a centerline of said continuous length of wire is between a first drive roller outside surface and a second drive roller outside surface.

9. The wire feeding mechanism of claim 8 wherein said included angles are each about thirty to about sixty degrees (30°-60°).

10. The wire feeding mechanism of claim 6 wherein at least one of said first and second drive rollers compressively engages said continuous length of wire to advance said wire along said passageway in response to rotation of said at least one of said first and second drive rollers.

11. The wire feeding mechanism of claim 6 further including:
 a second set of roller supports each rotatable about a corresponding axis transverse to a wire pathway, said second set of roller supports spaced apart from said two roller supports along said pathway, each of said second set of roller supports being on opposite sides of said pathway and being driveably engaged with each other;
 a third drive roller concentrically disposed with one of said second set of roller supports for rotation therewith, said third drive roller including a third drive roller groove extending circumferentially therearound and having a third drive roller included angle of less than ninety degrees (90°);
 a fourth drive roller concentrically disposed with the other of said second set of roller supports for rotation therewith, said fourth drive roller including a fourth drive roller groove extending circumferentially therearound and having a fourth drive roller included angle of less than ninety degrees (90°), said fourth drive roller positioned opposite said third drive roller so that said wire is compressively received between said third and fourth drive rollers for advancement along said passageway in response to rotation of said third and fourth drive rollers.

12. The wire feeding mechanism of claim 6 wherein said first drive roller includes a second first drive roller groove extending circumferentially therearound and spaced from said first drive roller groove for use when said first drive roller groove is worn.

13. The wire feeding mechanism of claim 6 wherein at least one of said first and second drive rollers is radially adjustably positionable relative to said pathway.

14. A wire feeding mechanism for advancing a continuous length of wire along a pathway, comprising:
 a first drive roller rotatably supported in a housing for engaging and advancing a continuous length of wire along a pathway;
 a second drive roller rotatably supported in said housing on an opposite side of said pathway from said first drive roller for engaging and advancing said wire along said pathway; and
 said first and second drive rollers each including an outer surface extending circumferentially thereabout, said outer surface having a first side wall and a second side wall extending radially thereinto that together define a groove, said first side wall intersecting said second wall and oriented at an angle of less than ninety degrees (90°) relative to said second side wall.

15. The wire feeding mechanism of claim 14 wherein said first and second drive rollers positioned to compressively engage said wire to advance said wire along said pathway in response to rotation of said first and second drive rollers.

16. The wire feeding mechanism of claim 14 further including:
 a housing having two roller supports each rotatable about a corresponding axis transverse to a wire pathway, said first and second drive rollers mounted on said roller supports for rotation therewith and said roller supports being driveably engaged with one another.

17. The wire feeding mechanism of claim 14 wherein the first side wall is oriented at an angle of between about thirty and about sixty degrees (30°-60°).

18. The wire feeding mechanism of claim 14 wherein a centerline of said continuous length of wire is above said outer surface of both of said drive rollers.

19. The wire feeding mechanism of claim 18 wherein said first side wall is oriented at an angle of between about thirty and about sixty degrees (30°-60°).

20. The wire feeding mechanism of claim 19 wherein said first side wall is oriented at an angle of about sixty degrees (60°).

* * * * *